US008526470B2

(12) United States Patent
Ramanath (10) Patent No.: US 8,526,470 B2
(45) Date of Patent: Sep. 3, 2013

(54) SYNCHRONIZED COMMANDS FOR NETWORK TESTING (75) Inventor: Avinash Ramanath, Northridge, CA (US)

(73) Assignee: Ixia, Calabasas, CA (US)

( * ) Notice: Subject to any disclaimer, the term of this patent is extended or adjusted under 35 U.S.C. 154(b) by 148 days.

(21) Appl. No.: 13/176,621

(22) Filed: Jul. 5, 2011

(65) Prior Publication Data

US 2013/0010602 A1 Jan. 10, 2013

(51) Int. Cl.
*H04J 3/06* (2006.01)

(52) U.S. Cl.
USPC ........... 370/503; 370/401; 370/392; 370/389; 370/466; 709/23; 715/700

(58) Field of Classification Search
None
See application file for complete search history.

(56) References Cited

U.S. PATENT DOCUMENTS

| | | | |
|---|---|---|---|
| 5,854,889 A | 12/1998 | Liese | |
| 6,189,031 B1 * | 2/2001 | Badger et al. | 709/224 |
| 6,295,557 B1 | 9/2001 | Foss | |
| 6,360,332 B1 | 3/2002 | Weinberg | |
| 6,397,359 B1 | 5/2002 | Chandra et al. | |
| 6,473,794 B1 | 10/2002 | Guheen et al. | |
| 6,560,648 B1 | 5/2003 | Dunn et al. | |
| 6,640,249 B1 | 10/2003 | Bowman-Amuah | |
| 6,664,978 B1 | 12/2003 | Kekic et al. | |
| 6,724,730 B1 | 4/2004 | Mlinarsky | |
| 6,788,315 B1 | 9/2004 | Kekic et al. | |
| 6,873,600 B1 | 3/2005 | Duffield et al. | |
| 6,912,717 B2 | 6/2005 | Miller et al. | |
| 6,957,186 B1 | 10/2005 | Guheen et al. | |
| 6,970,560 B1 | 11/2005 | Hench et al. | |
| 6,993,578 B1 | 1/2006 | Dmitroca | |
| 7,075,893 B1 | 7/2006 | Mlinarsky | |
| 7,099,438 B2 | 8/2006 | Rancu et al. | |
| 7,181,383 B1 | 2/2007 | McGaughy et al. | |
| 7,409,328 B1 | 8/2008 | McGaughy et al. | |
| 7,412,034 B2 * | 8/2008 | Rancu et al. | 379/9 |
| 7,447,622 B2 | 11/2008 | Arama et al. | |
| 7,453,885 B2 | 11/2008 | Rogers | |
| 7,492,720 B2 | 2/2009 | Pruthi et al. | |
| 7,508,769 B1 | 3/2009 | Duffield et al. | |
| 7,515,585 B2 | 4/2009 | Rittmeyer et al. | |
| 7,526,478 B2 | 4/2009 | Friedman | |
| 7,536,455 B2 | 5/2009 | Duffield et al. | |
| 7,607,169 B1 | 10/2009 | Njemanze et al. | |
| 7,657,623 B2 | 2/2010 | Chisholm | |
| 7,676,287 B2 | 3/2010 | Eryurek et al. | |
| 7,739,605 B2 | 6/2010 | Plotkin et al. | |
| 7,765,093 B2 | 7/2010 | Li et al. | |

(Continued)

OTHER PUBLICATIONS

European Patent Office, European Search Report for European Application No. 12001942.7, mail date Oct. 11, 2012, pp. 1-8.

*Primary Examiner* — Duc C Ho (74) *Attorney, Agent, or Firm* — SoCal IP Law Group LLP; John E. Gunther; Steven C. Sereboff (57) ABSTRACT

Methods and test systems for testing a network. A test system may emulate a plurality of users, each emulated user executing a user activity. Each emulated user activity may include one or more commands. At least some emulated user activities may include a first command associated with a first protocol synchronized with a second command associated with a second protocol different from the first protocol. The test system may report a result of emulating the plurality of users.

18 Claims, 7 Drawing Sheets

(56) References Cited

U.S. PATENT DOCUMENTS

| | | |
|---|---|---|
| 7,885,803 B2 | 2/2011 | Nuzman et al. |
| 7,944,844 B2 | 5/2011 | Ee et al. |
| 7,992,040 B2 | 8/2011 | Agarwal et al. |
| 8,028,055 B2 | 9/2011 | Duffield et al. |
| 8,031,627 B2 | 10/2011 | Ee et al. |
| 8,041,810 B2 | 10/2011 | Yang et al. |
| 8,051,163 B2 | 11/2011 | Ruiz et al. |
| 8,125,897 B2 | 2/2012 | Ray et al. |
| 8,144,150 B2 | 3/2012 | Gilbert et al. |
| 2002/0198985 A1 | 12/2002 | Fraenkel et al. |
| 2005/0226249 A1 | 10/2005 | Moore |
| 2006/0013252 A1* | 1/2006 | Smith .......... 370/466 |
| 2006/0262729 A1 | 11/2006 | Chau et al. |
| 2007/0179641 A1 | 8/2007 | Lucas et al. |
| 2009/0073985 A1 | 3/2009 | Rogers |
| 2009/0187654 A1 | 7/2009 | Raja et al. |
| 2010/0064039 A9 | 3/2010 | Ginter et al. |
| 2010/0268524 A1 | 10/2010 | Nath et al. |
| 2011/0022700 A1 | 1/2011 | Ramanath et al. |

\* cited by examiner

SYNCHRONIZED COMMANDS FOR NETWORK TESTING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7 protocols include the Hyper-Text Transfer Protocol (HTTP) used to convey HTML documents such as Web pages, and the Simple Mail Transfer Protocol (SMTP) and Post Office Protocol (POPS) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. Each port unit may emulate a plurality of network users, clients, peers, servers, or other network devices.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

DETAILED DESCRIPTION

Description of Apparatus

Figure 1:
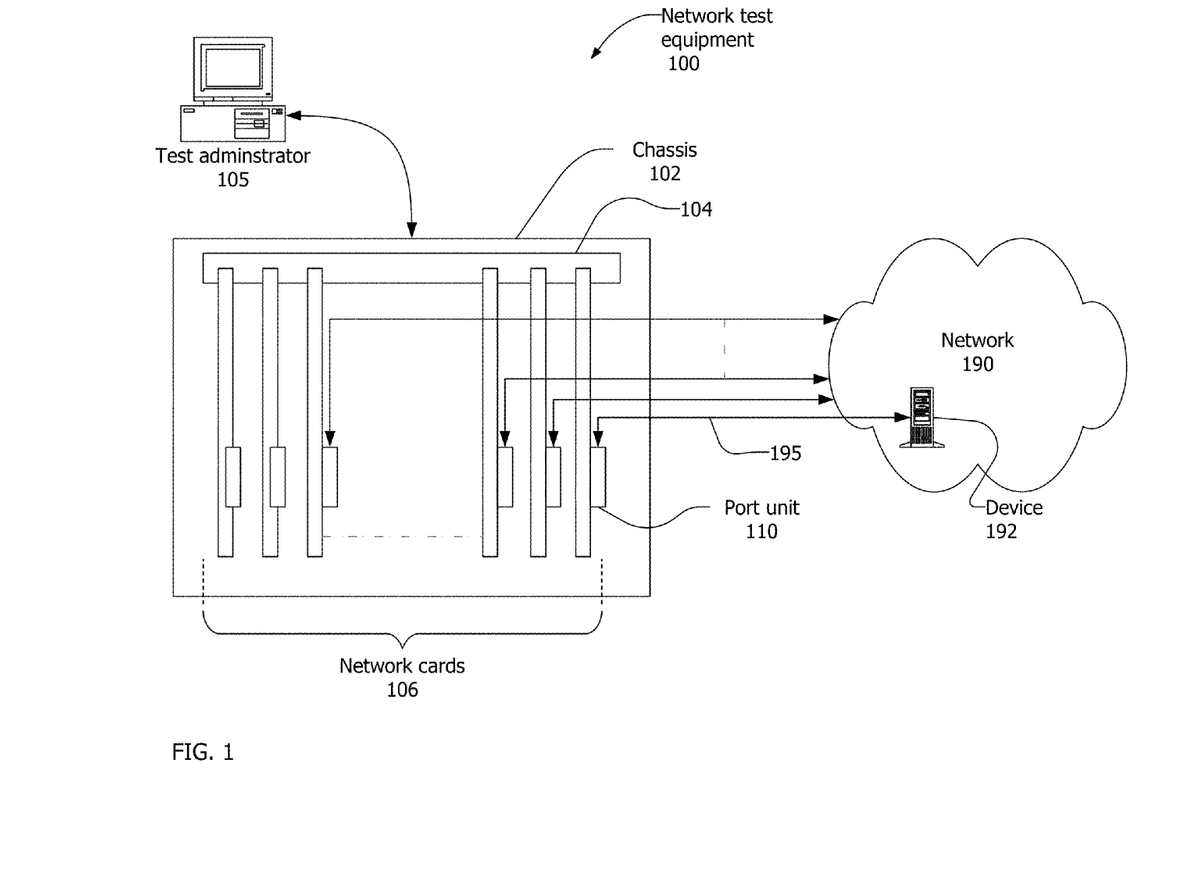
FIG. 1 is a block diagram of a network environment.

FIG. 1 shows a block diagram of a network environment. The environment may include a test administrator 105, network test equipment 100, and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. The network cards 106 may be permanently installed in the network test equipment 100 or may be removable.

Each network card 106 may contain one or more port unit 110. Each port unit may include circuits and software to generate test traffic and/or to receive and analyze test traffic. Each port unit may be coupled to the test administrator 105. Each port unit 110 may connect to the network 190 through one or more ports. Each port unit 110 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The test administrator 105 may be a computing device included within or coupled to the network test equipment 100. The test administrator 105 may include an operator interface (not shown) that may be used to plan a test session, to control the test session, and/or to view test results during and after the test session. The operator interface may include, for example, a display and a keyboard, mouse, and/or other input devices (not shown). The test administrator 105 may include or be coupled to a printer or other data output device (not shown) for output of test results. The test administrator 105 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Description of Processes

Figure 2:
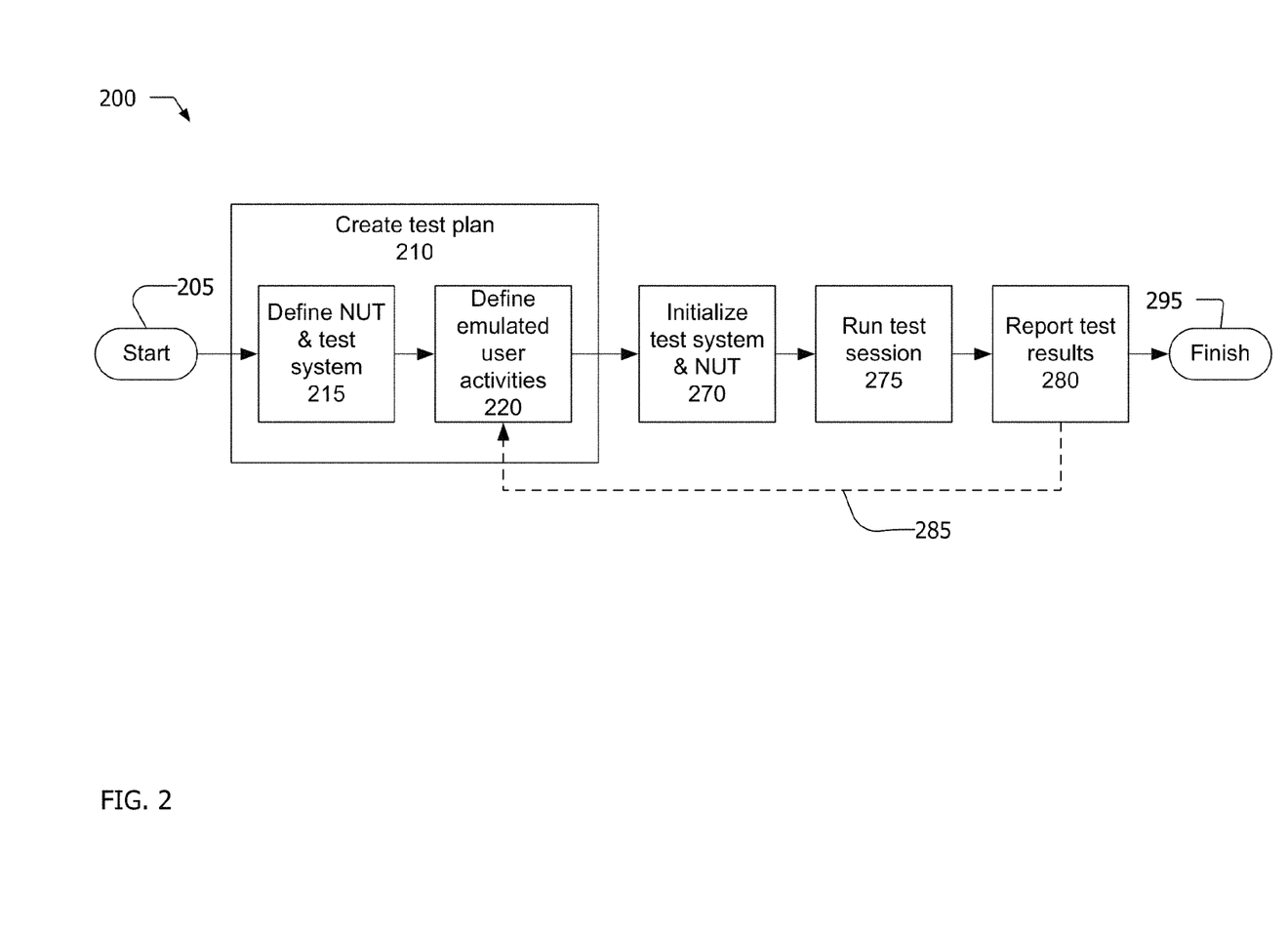
FIG. 2 is a flow chart of a process for testing a network.

Referring now to FIG. 2, a process 200 for testing a NUT may start at 205 and finish at 295. The process 200 may be executed within a test environment such as that shown in FIG. 1. The process 200 may be performed using a test administrator 105 in conjunction with network test equipment 100. The process 200 may be used to test a network such as the network 190 and/or a network device such as the network device 192.

The process 200 may include creating a test plan at 210, initializing a test system and the NUT at 270, running a test session according to the test plan at 275, and reporting test results at 280. For ease of description, these actions are shown to be sequential in FIG. 2. However, these actions may be performed, to at least some extent, concurrently. For example, interim test results may be reported at 280 while a test session is still running at 275. Further, the process 200 may be, to at least some extent, cyclic. For example, interim test results reported at 280 may be used to modify the test plan, either automatically or as a result of some user action, as indicated by dashed line 285.

Creating a test plan at 210 may include defining the network and/or device to be tested (the network under test or NUT) and the architecture of the test system at 215. Defining the test system at 215 may include defining the test equipment that will conduct the test, including the number and type of port units that will be connected to the network or device under test. Defining the test system at 215 may also include definitions of what each port unit will represent or emulate during the test. For example, a particular port unit may be tasked to emulate a local area network encompassing a particular block of IP (internet protocol) addresses. For further example, a port unit may be tasked to emulate a large plurality of user devices that access a wireless network through a particular access point.

After the NUT and the test system are defined at 215, the test traffic to be generated during the test session may be defined. The test traffic and the techniques used to define the test traffic may depend on the type of network or device to be tested. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant. However, when the NUT operates at a higher layer of the network structure (for example, a server, a server load balancer, a network security device that performs packet inspection, and other network devices), the test traffic may include or be a plurality of simulated application-layer transactions. In this case, the test traffic may be defined at 220 by a plurality of emulated user (EU) activities, each of which causes some traffic to be generated and transmitted via the NUT.

An EU activity may be any activity or transaction that can be performed by a user computing device, where a "user computing device" is any device that receives services from or via a network. User computing devices may include personal computers, laptop computers, set top boxes, video game systems, personal video recorders, telephones, smart phones, personal digital assistants, e-mail appliances, and any other computing device connected to a network. During a subsequent test session, the test system may emulate EUs performing the activities defined at 220 and thus automatically convert the defined EU activities into traffic for testing the NUT.

Figure 3:
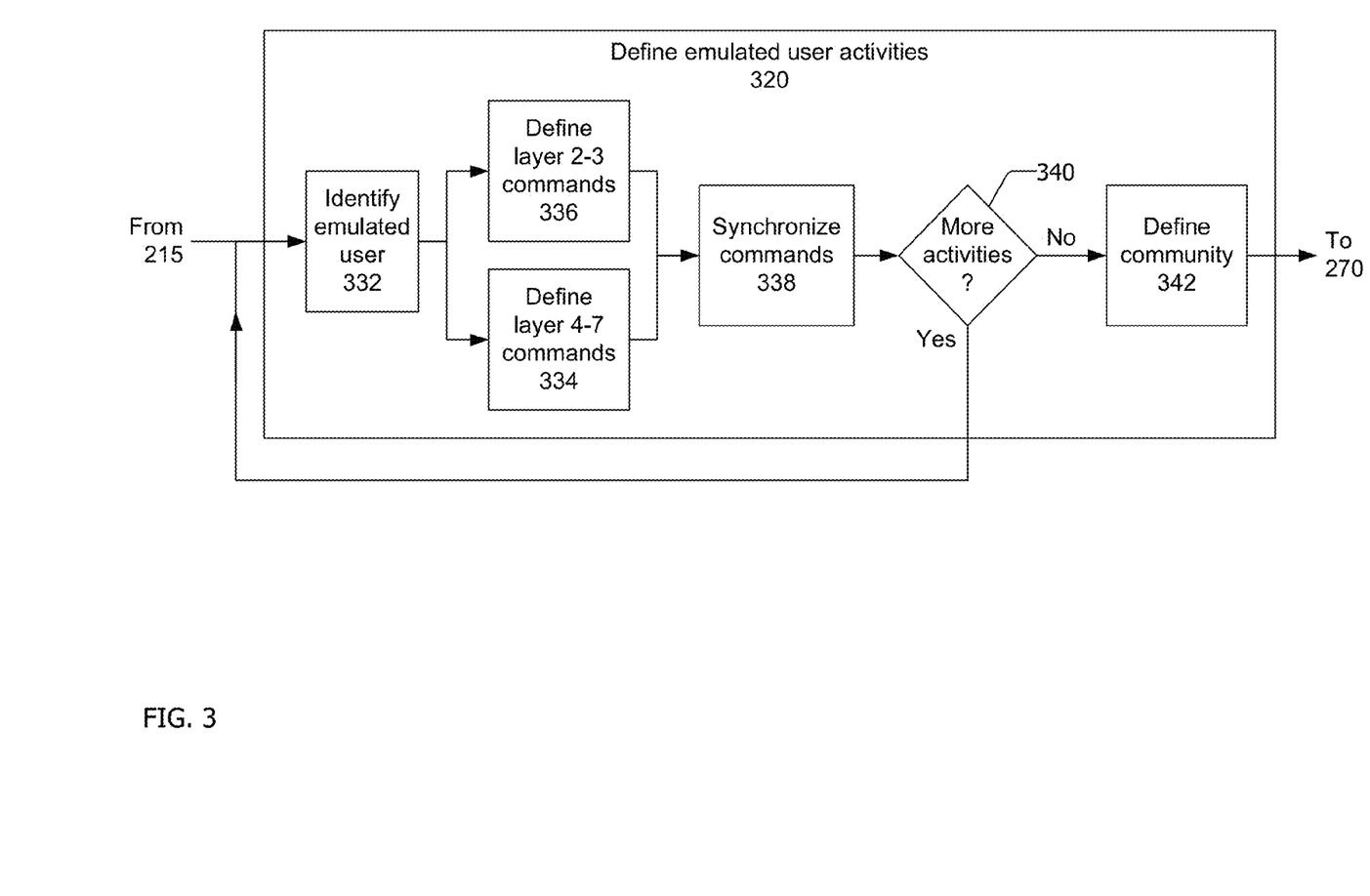
FIG. 3 is a flow chart of a process for defining test traffic.

Referring now to FIG. 3, a process 320 for defining test traffic in terms of EU activities may be suitable for use at 220 in the process 200 of FIG. 2. After the test system and the NUT are defined (at 215 in FIG. 2), an EU activity may be defined. Defining the EU activity may begin by identifying the EU at 332. The EU may be identified by assigning a MAC (media access control) address, an IP address, an IMSI (international mobile subscriber identification), an MSIN (mobile subscriber identification number), or in some other way that distinguishes the EU. The EU identification may also indicate, in view of the test system definition from 215, what portion of the test system will emulate the EU and how the EU will be connected to the NUT.

The activity of the EU identified at 332 may include one or more commands. Each command may be associated with a protocol, which is to say that each command may be defined by and form a part of a communications protocol. Each EU activity may include one or more layer 4-7 commands defined at 334 and/or one or more layer 2-3 commands defined at 336. In this context, a "layer 2-3" command is a command associated with a layer 2 or layer 3 protocol. Similarly, a "layer 4-7 command" is a command associated with a layer 4 to layer 7 protocol. An EU activity may include commands from multiple layer 2-3 and/or layer 4-7 protocols The one or more layer 4-7 commands defined at 334 may be, for example, commands or requests to be made by the EU according to a layer 7 protocol such as HTTP, FTP, SMS, SMTP, POP3, SIP, and other application layer protocols used to transfer data, voice, video, and network control information over a network. The one or more layer 4-7 commands may, for example, cause a test system to emulate a user performing some task such as browsing the Internet, sending e-mail or text messages, making VOIP (voice over Internet protocol) or cellular telephone calls, or some other activity. The one or more layer 2-3 commands may be commands that affect the NUT and/or the connection between the EU and the NUT independent of the execution of the layer 4-7 commands. For example, when the NUT is a portion of a wireless network, possible layer 2-3 commands include, for example, requesting a bearer modification, emulating a handoff between cells, emulating a tracking area update, and other network management actions performed within wireless networks. When the NUT is a portion of a wired network, possible layer 2-3 commands include, for example, a DHCP (Dynamic Host Configuration Protocol) request and a DHCP release.

At 338, at least a first command associated with a first protocol and a second command associated with a second protocol different from the first protocol may be synchronized. The first and second commands may be layer 4-7 commands entered at 334. The first and second commands may be layer 2-3 commands entered at 336. The first and second commands may include a layer 4-7 command and a layer 2-3 command. In this context, the term "synchronized" means that a desired temporal relationship is defined between two or more commands. Examples of a desired temporal relationship include requiring that commands be performed in a specific order, or requiring that certain commands be performed concurrently, or requiring that commands associated with different protocols be interleaved in a prescribed order. Continuing the example of a wireless network, a command to emulate a cell handoff may be synchronized with an FTP Get command such that the emulated cell handoff occurs during the downloading of a file from the NUT. More than two commands may be synchronized at 338.

Figure 4:
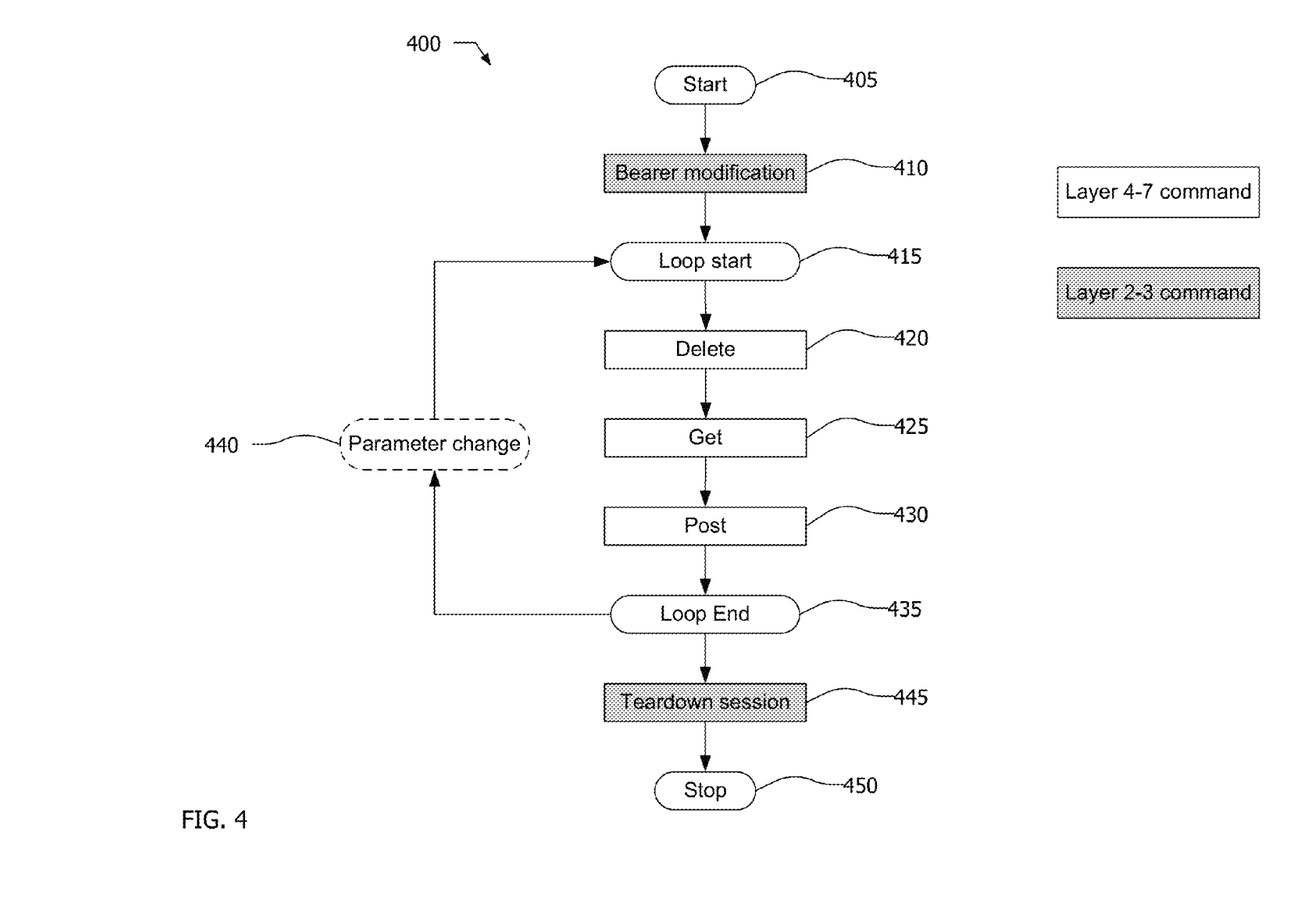
FIG. 4 is a graphical representation of an exemplary emulated user activity.

FIG. 4 is a graphical representation of an example EU activity 400 which may be defined using the process 320. The EU activity 400 may start at 405. The EU activity 400 may include two layer 2-3 commands 410 and 445, and three HTTP commands 420, 425, 430 that are performed within a loop defined by a loop start 415 and a loop end 435. The loop from 415 to 435 may be performed a designated number of times. Optionally, one or more parameters of the HTTP commands 420, 425, 430 may be changed at 440 each time the loop is repeated. After the loop has repeated the designated number of times, the EU activity 400 may end at 450.

Each EU activity defined in the process 320 may be independent of other EU activities. Layer 2-3 commands such as the Bearer Modification command 410 and the Teardown Session command 450 within the EU activity 400 may not have any effect on other EU activities.

Figure 5:
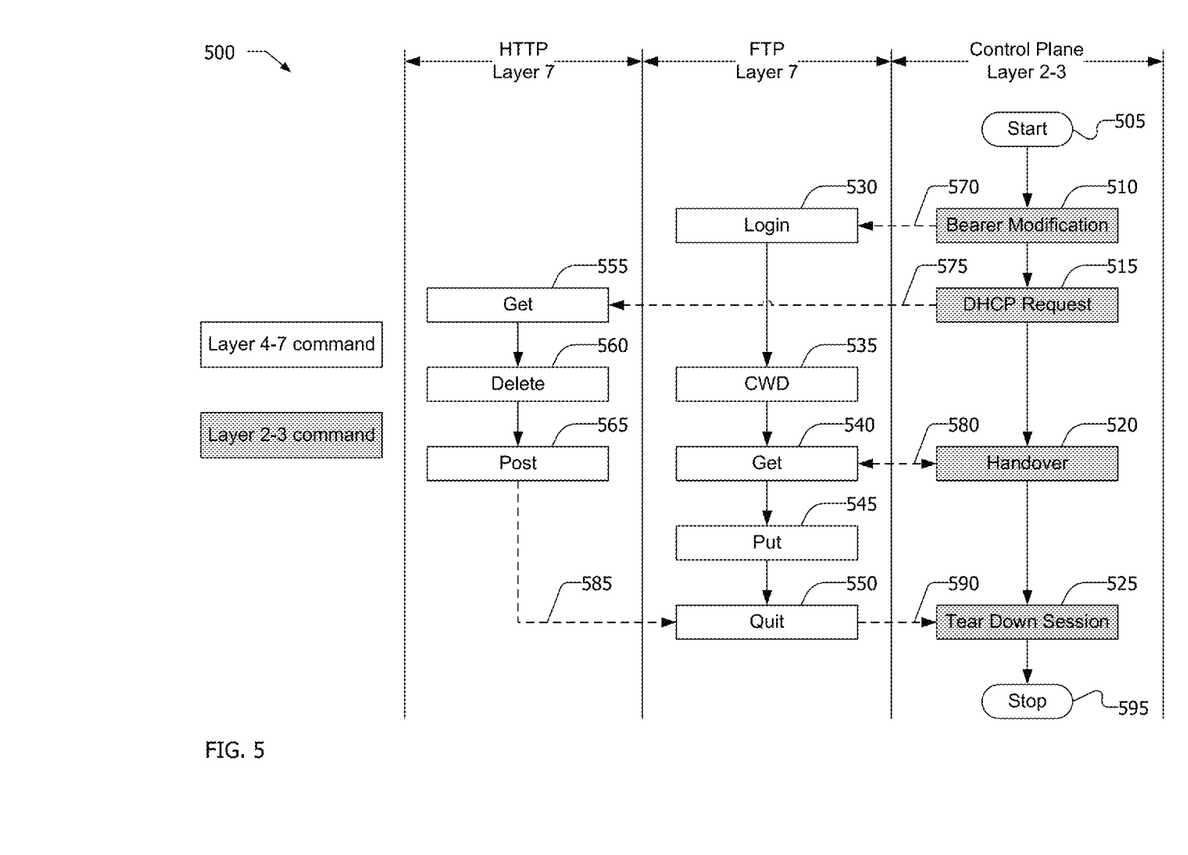
FIG. 5 is a graphical representation of another exemplary emulated user activity.

FIG. 5 is a graphical representation of a more complex EU activity 500 which also may be defined using the process 320. The EU activity 500 may start at 505. The EU activity 500 may include layer 2-3 commands 510, 515, 520, and 525; FTP commands 530, 535, 540, 545, and 550; and HTTP commands 555, 560, and 565. The layer 2-3 commands may include commands from two or more layer 2-3 protocols. In this example, the FTP commands 530-550 may be emulated using a wireless layer 2 protocol such as eGTP (Extended GPRS Tunneling Protocol), and the HTTP commands 555-565 may be emulated using a wired layer 2 protocol such as an Ethernet protocol. In this case, layer 2-3 commands 510, 520, and 525 may be eGTP Bearer Modification, Handover, and Tear Down commands and layer 2-3 command 515 may be a DHCP Request command.

Synchronization links 570, 575, 580, 585, 590 may be defined between commands such that the FTP Login command 530 is executed after the Bearer Modification command 510, the DHCP Request command 515 is executed between the Bearer Modification command 510 and the HTTP Get command 555, the Handover command 520 is executed during execution of the FTP Get command 540, the FTP Quit command 550 is executed after the HTTP Post command 565, and the Tear Down Session command 525 is executed after the FTP Quit command 550. Other types of synchronization may be defined between commands. Synchronization may be defined between layer 2-3 commands and layer 4-7 commands, between layer 2-3 commands of the same or different protocols, and between layer 4-7 commands of the same or different protocols.

EU activities, such as the EU activities 400 and 500, may be defined by a test engineer via a user interface to a test administrator computing device such as the test administrator 105. The test administrator computing device may provide a graphical user interface (GUI) to facilitate defining user actions.

Figure 6:
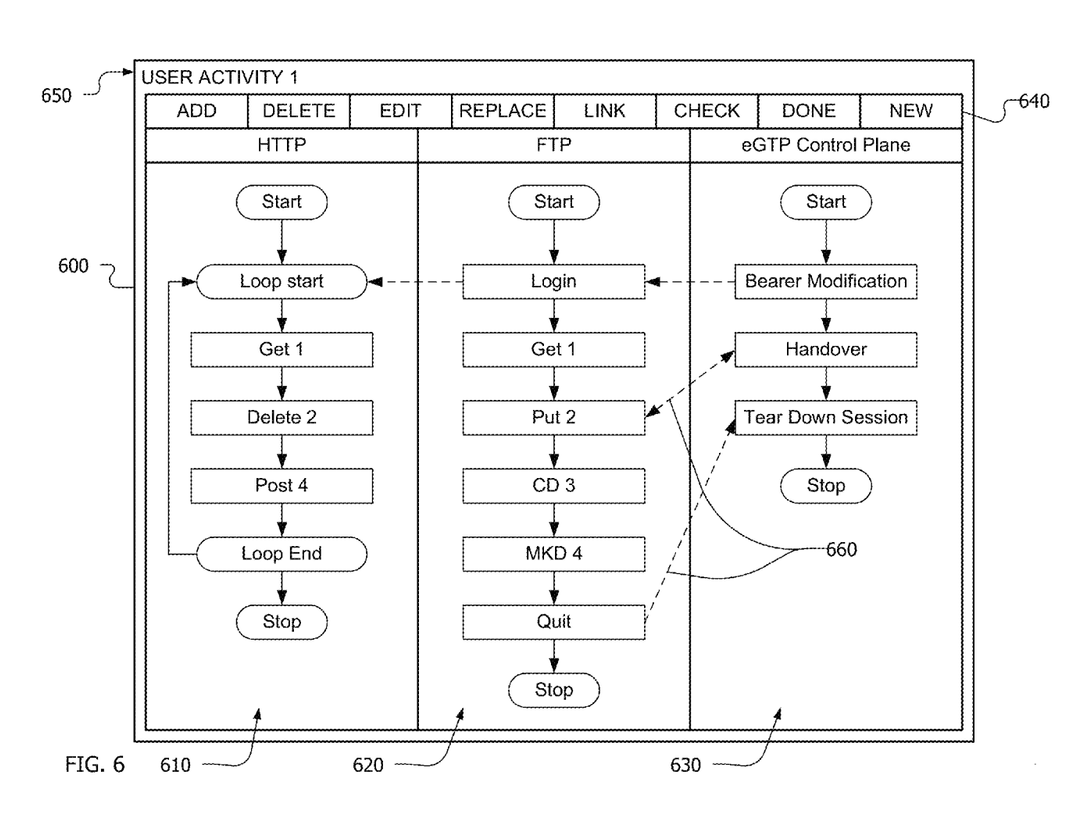
FIG. 6 is a representation of a graphical user interface.

FIG. 6 is a representation of a GUI 600 as it may appear after an EU activity similar to the EU activity 500 of FIG. 5 has been defined. The GUI 600 is an example of the nearly unlimited number of possible configurations of a GUI for defining EU activities. The GUI 600 may have a plurality of panes 610, 620, 630 showing commands for a corresponding plurality of protocols. In this example, pane 610 shows HTTP commands, pane 620 shows FTP commands, and pane 630 shows control plane commands for a wireless network using eGTP. The GUI 600 may include an identifier 650 for the EU activity being defined, and a plurality of control buttons 640. The control buttons 640 may include (from left to right) controls to add, delete, edit, or replace a command within the EU activity. The control buttons may also include a control to link or synchronize commands, a control to check whether the defined commands are self-consistent and executable, a control to indicate that the definition of a particular EU activity is done, and a control to start defining a new EU activity. These controls may be augmented by pop-up lists, pull-down menus, and additional display screens to facilitate defining each EU activity. For example, clicking or designating the "add" button may open a pull-down list of the possible commands that may be added. Similarly, highlighting a particular command and designating the "edit" button may open a pop-up editable list of parameters associated with the highlighted command.

Referring back to FIG. 3, the process 320 for defining test traffic may be cyclic in nature. At 340 a determination may be made if additional EU activities are required during a test session, and the actions from 332-338 may be repeated as necessary until all EU activities are defined.

A test session for a complex NUT may require test traffic including literally millions of packets representing the activities of thousands or hundreds of thousands of EUs. It may be impractical or undesirable to individually define the activity of each EU. Therefore a finite number of EU activities may be defined at 332-338 and then replicated to form an EU "community" including a large plurality of EUs to be emulated by the test system. When a determination is made at 340 that all EU activities are defined, an EU community may be defined at 342

Figure 7:
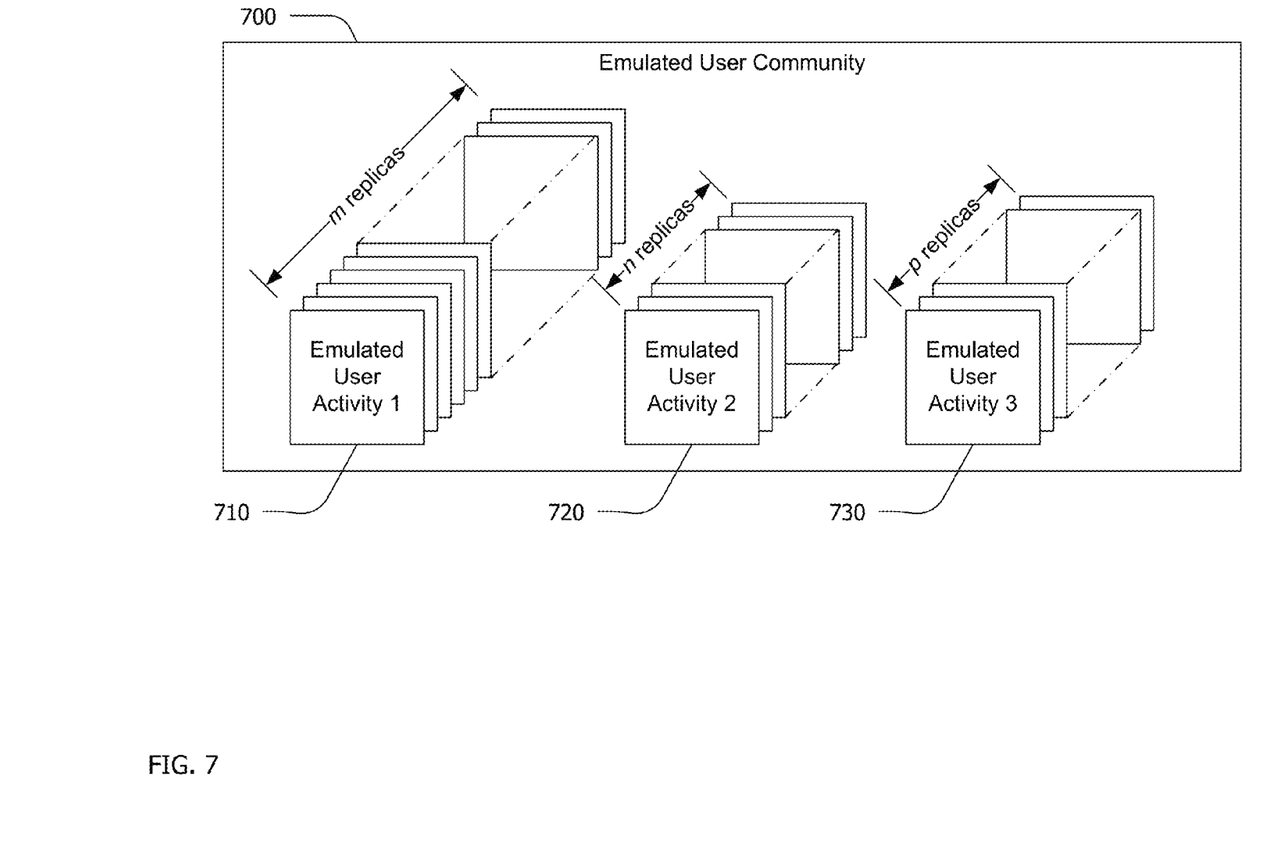
FIG. 7 is a graphical representation of an emulated user community.

Referring now to FIG. 7, an exemplary EU community 700 may be composed of a plurality of EUs, each of which is performing or executing a defined EU activity. The exemplary EU community 700 includes EUs replicating three different EU activities 710, 720, 730. In this patent, the term "replicate" means "to copy, but not necessarily identically". The replicas of a given EU activity may differ in some aspect. For example, each replica of a given EU activity may be assigned a different MAC or IP address, or may be assigned a different mobile user identification number. The example EU community 700 contains m replicas of EU activity 1, n replicas of EU activity 2, and p replicas of EU activity 3, where m, n, and p are positive, and possibly large, integers. An EU community may include more one or more different EU activities. The number of EU activities may be smaller than a number of EUs within an EU community. For example, the number of EUs in an EU community may be N and the number of predefined user activities may be M, where N and M are positive integers and N is greater than or equal to M. The number of replicas of each EU activity within an EU community may be the same or different for each EU activity.

At least some of the EU activities within an EU community may include one or more layer 4-7 commands and one or more layer 2-3 commands synchronized with another layer 2-3 command or one of the layer 4-7 commands. An EU activity may contain a plurality of layer 4-7 commands and a plurality of layer 2-3 commands, at least some of which are synchronized with layer 4-7 commands. An EU activity may contain a plurality of layer 4-7 commands, some of which may be synchronized with other layer 4-7 commands.

Referring back to FIG. 2, after the test traffic is defined at 220, the test system and the NUT may be initialized at 270. Initializing the test system at 270 may include transferring data and instructions to the port units of the test system to enable the port units to emulate the EU activities defined at 220. Initializing the test system may also include providing instructions to the port units indicating what test results should be captured during the test session. These instructions may include instructions to accumulate certain traffic statistics as well as instructions and criteria for capturing packets entering and/or exiting the NUT. Initializing the test system and the NUT at 270 may include the test system and the NUT exchanging information such that the NUT becomes aware of the configuration of the test system. For example, the test system and the NUT may use standard routing protocols and/or discovery protocols to inform the NUT what IP addresses are emulated at each port unit of the test system.

When the test traffic is defined at 220 in terms of application-layer EU activities, each defined EU activity may result in one or a plurality of packets that may be generated and transmitted during the ensuing test session. For example, an HTTP Get command may result in the opening of a TCP connection (which involves the exchange of several TCP/IP packets) followed by a single TCP/IP packet conveying the HTTP Get request. The HTTP Get command may also result in a test port unit generating and transmitting one or more TCP/IP packets to the NUT, or a test port unit emulating a server responding to the HTTP Get request. An FTP Put command may result in generation and transmission of a large plurality of TCP/IP packets representing the content of the file that is being uploaded. When the test traffic is defined at 220 in terms of application-layer EU activities, initializing the test system at 270 may also include translating at least some EU activities into instructions for a plurality of packets to be generated and sent during the test session. Alternatively, EU activities may be communicated to test equipment port units and may be translated into appropriate packets in real-time as the test session progresses.

After the test system and the NUT are initialized at 270, the test session may be run or executed at 275. Running the test session may include executing the EU activities defined at 220, which is to say the test equipment may emulate users performing the defined EU activities. Executing the EU activities may include generating and transmitting test traffic to the NUT, receiving test traffic transmitted through the NUT and/or responses generated within the NUT, and accumulating test data such as received traffic statistics and captured packets. The defined replicas of a given EU activity may or may not be executed concurrently. For example, the number of concurrent replicas of one or more EU activities may be gradually increased during a test session to investigate the effect of increasing traffic load on the performance of a NUT. For example, Published Patent Application No. US2011/0022700A1 describes how a GUI may be used to define a timeline for scaling traffic load during a test session.

Interim and final results of the test performed at 275 may be reported at 280. Reporting test results at 280 may include processing (i.e. sorting, filtering, and/or aggregating) traffic statistics; displaying the processed traffic statistics; storing and/or printing raw or processed traffic statistics; and storing, displaying, and/or printing captured packets. Although the results of each executed EU activity may not be individually reported at 280, each EU activity may contribute, to some extent, to the test results reported at 280. For example, the test results reported at 280 may include test statistics such as a total number of packets received, a number of packets received out-of-order, an average packet latency time, a maximum number of concurrent connections, and other statistics, each of which may be aggregated over some or all of the executed EU activities.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method performed by a test system coupled to a network under test, comprising:
   emulating a plurality of users, each emulated user (EU) executing an EU activity, wherein
      each EU activity causes the test system to generate and transmit traffic via the network under test,
      each EU activity comprises one or more commands, and
      at least some EU activities comprise a first command associated with a first protocol synchronized with a second command associated with a second protocol different from the first protocol; and
   reporting a result of emulating the plurality of users.

2. The method of claim 1, further comprising:
   providing a graphical user interface, and
   receiving a definition of each EU activity from a user via the graphical user interface.

3. The method of claim 1, wherein
   the plurality of users consists of N users, each of which executes one of M predefined EU activities, where N and M are positive integers and N is greater than or equal to M.

4. The method of claim 1, wherein
   the first command is associated with a first layer 2-3 protocol and the second command is associated with a second layer 2-3 protocol different from the first layer 2-3 protocol.

5. The method of claim 1, wherein
   the first command is associated with a layer 2-3 protocol and the second command is associated with a layer 4-7 protocol.

6. The method of claim 5, wherein
   the second command is associated with one of Hyper-Text Transfer Protocol, Simple Mail Transfer Protocol, Post Office Protocol, Simple Message System protocol, File Transfer Protocol, Real Time Protocol, Real-time Transport Control Protocol, Real Time Streaming Protocol, Media Gateway Control Protocol, and Session Initiation Protocol.

7. A method for testing a network under test, comprising:
   defining one or more emulated user (EU) activities, wherein
      each EU activity comprises one or more commands, and
      at least some EU activities comprise a first command associated with a first protocol synchronized with a second command associated with a second protocol different from the first protocol;
   defining an EU community comprising a plurality of EUs, each of the plurality of EUs performing one of the defined EU activities;
   emulating the EU community using a test system coupled to the network under test, each EU activity performed by the plurality of EUs causing the test system to generate and transmit traffic via the network under test; and
   reporting a result of emulating the EU community.

8. The method of claim 7, further comprising:
   providing a graphical user interface; and
   receiving a definition of each EU activity from a user via the graphical user interface.

9. The method of claim 7, wherein
   the plurality of EUs consists of N EUs, each of which executes one of M predefined EU activities, where N and M are positive integers and N is greater than or equal to M.

10. The method of claim 7, wherein
the first command is associated with a first layer 2-3 protocol and the second command is associated with a second layer 2-3 protocol different from the first layer 2-3 protocol.

11. The method of claim 7, wherein
the first command is associated with a layer 2-3 protocol and the second command is associated with a layer 4-7 protocol.

12. The method of claim 11, wherein
the second command is associated with one of Hyper-Text Transfer Protocol, Simple Mail Transfer Protocol, Post Office Protocol, Simple Message System protocol, File Transfer Protocol, Real Time Protocol, Real-time Transport Control Protocol, Real Time Streaming Protocol, Media Gateway Control Protocol, and Session Initiation Protocol.

13. A test system, comprising:
one or more port units coupled to a network under test
a test administrator computing device coupled to the one or more port units
the test administrator computing device and the one or more port units comprising hardware and software for
emulating a plurality of users, each emulated user (EU) executing an EU activity, wherein
each EU activity comprises one or more commands
at least some EU activities comprise a first command associated with a first protocol synchronized with a second command associated with a second protocol different from the first protocol
reporting a result of emulating the plurality of EUs.

14. The test system of claim 13, the hardware and software further for:
providing a graphical user interface
receiving a definition of each EU activity from a user via the graphical user interface.

15. The test system of claim 13, wherein
the plurality of users consists of N users, each of which executes one of M predefined EU activities, where N and M are positive integers and N is greater than or equal to M.

16. The test system of claim 13, wherein
the first command is associated with a first layer 2-3 protocol and the second command is associated with a second layer 2-3 protocol different from the first layer 2-3 protocol.

17. The test system of claim 13, wherein
the first command is associated with a layer 2-3 protocol and the second command is associated with a layer 4-7 protocol.

18. The test system of claim 17, wherein
the second command is associated with one of Hyper-Text Transfer Protocol, Simple Mail Transfer Protocol, Post Office Protocol, Simple Message System protocol, File Transfer Protocol, Real Time Protocol, Real-time Transport Control Protocol, Real Time Streaming Protocol, Media Gateway Control Protocol, and Session Initiation Protocol.

* * * * *